United States Patent [19]

Guerra et al.

[11] 4,425,184
[45] Jan. 10, 1984

[54] METHOD OF FORMING A DECORATIVE SURFACE ON A BODY OF GLASS

[75] Inventors: Salvatore Guerra, Detroit; John H. Meyer, Milford; Thomas E. Boller, Southfield, all of Mich.

[73] Assignee: Ford Motor Company, Dearborn, Mich.

[21] Appl. No.: 481,427

[22] Filed: Apr. 1, 1983

[51] Int. Cl.³ .......................... B44C 1/22; C23F 1/00
[52] U.S. Cl. .................................. 156/655; 156/667; 252/79.3
[58] Field of Search .................. 156/655, 656, 659.1, 156/663, 667; 252/79.3; 65/60.52, 31

[56] References Cited
U.S. PATENT DOCUMENTS
2,606,566  8/1952  Tarnopol .................. 156/677 X Primary Examiner—William A. Powell
Attorney, Agent, or Firm—William E. Johnson; Olin B. Johnson

[57] ABSTRACT

This specification discloses a method of forming a decorative surface on a body of glass. The steps involved in the method are initiated by a step of forming a metallic oxide film on the surface of the body of glass to be decorated. At least the portion of the body of glass having the metallic oxide film thereon is immersed in an etchant acid bath. Thereafter the body of glass is removed from the etchant acid bath when the etchant acid bath has reacted with the metallic oxide film to create a decorative surface on the body of glass. The decorative surface includes a plurality of elongated lines generally intersecting with one another. In normal cases the metallic oxide film is a multicomponent metallic oxide film.

2 Claims, 2 Drawing Figures

METHOD OF FORMING A DECORATIVE SURFACE ON A BODY OF GLASS

TECHNICAL FIELD

This specification is directed to a method of forming a decorative surface of a body of glass and, more particularly, is directed to such a method of decorating a surface of a glass body in which the surface has a metallic oxide film thereon which aids in the generation of the decorative surface.

BACKGROUND ART AND PRIOR ART STATEMENT

No search was carried out on the method of this invention in the U.S. Patent and Trademark Office or in any other search facility. We are unaware of any prior art which is relevant to the method of forming a decorative surface on a body of glass as taught and claimed in this specification.

DISCLOSURE OF THE INVENTION

This invention is directed to a method of forming a decorative surface on a body and, more particularly, to a method of forming a decorative surface on a body of glass.

In accordance with the broad principles and teachings of our method, a metallic oxide film is formed on the surface of the body of glass to be decorated. At least a portion of the body of glass having the metallic oxide film thereon is immersed in an etchant acid bath. The body of glass is removed from the etchant acid bath when the etchant acid bath has reacted with the metallic oxide film to create a decorative surface on the body of glass. The decorative surface includes a plurality of elongated lines generally intersecting one another. Normally, the metallic oxide film is a multicomponent metallic oxide film.

In accordance with one preferred embodiment of our method, a decorative surface is formed on a sheet of soda/lime silica glass in the following manner. A metallic oxide film is formed on one surface of the sheet of flat glass to be decorated. At least the surface of the sheet of glass having the metallic oxide film thereon is treated with an etchant acid bath. The treatment is accomplished by bringing the etchant acid bath into contact with the surface of the sheet of flat glass having the metallic oxide film thereon. The etchant acid bath is removed from treating contact with the surface of the sheet of glass having the metallic oxide film thereon when the etchant acid bath has reacted with the metallic oxide film to create a decorative surface on the sheet of glass. The decorative surface generally includes a plurality of elongated lines intersecting one another.

In accordance with still another embodiment of the method of our invention, a decorative surface is formed on one side of a sheet of soda/lime silica glass in the following manner. A multicomponent metallic oxide film is formed on the one side of the sheet of soda/lime silica glass. The surface of the sheet of glass having the metallic oxide film thereon is contacted with an etchant acid bath containing at least hydrofluoric and nitric acids. Thereafter, contact between the surface of the glass sheet having the metallic oxide film thereon and the etchant acid bath is interrupted when the etchant acid bath has reacted with the metallic oxide film to create a decorative surface on the sheet of glass. The decorative surface is characterized in that it includes a plurality of elongated lines generally intersecting one another. In accordance with still additional teachings of a preferred embodiment of the method of this invention, the multicomponent metallic oxide film includes cobalt, chrome and iron as the metallic ingredients thereof.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying photographs, in which:

BEST MODE AND INDUSTRIAL APPLICABILITY

Figure 1:
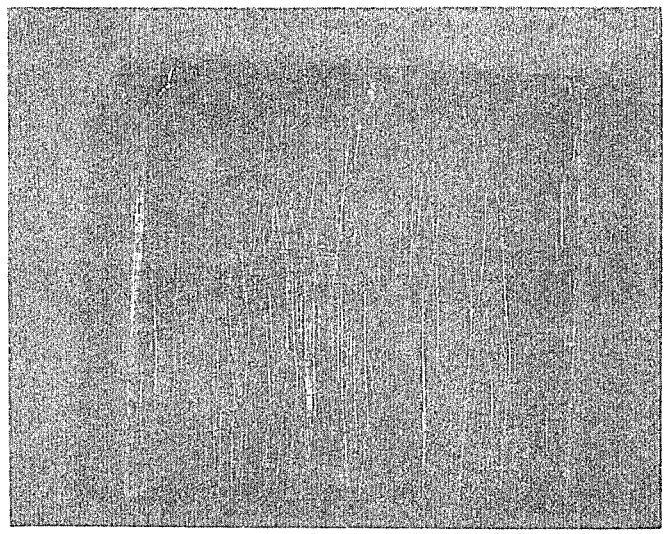
FIG. 1 is a picture of a flat glass sheet having a decorative surface formed thereon in accordance with the method of this invention.

The following description is what we consider to be a preferred embodiment of our method of forming a decorative surface on a body of glass. The following description also sets forth what we now contemplate to be the best mode of carrying out the method of this invention. This description is not intended to be a limit upon the broader principles of this method and, while preferred materials are used to illustrate the method in accordance with the requirements of the U.S. patent laws, it does not mean that the method is operative only with the stated materials as others may be substituted therefor.

Also, for example, the method disclosed for forming a decorative surface on a body of glass may be successfully used with materials yet to be developed by skilled artisans such as materials which provide a metallic oxide film on a body of glass. It is therefore contemplated by us that the method disclosed in this specification may also be successfully used with materials which are yet to be developed because the principles of operation of the method remain the same, regardless of the particular materials subjected to the method or used with the method.

The preferred embodiment of the method of this invention will be demonstrated by showing how one can develop a decorative surface on a body of glass. In the case of the preferred embodiment, the body of glass is a flat glass ribbon of soda/lime silica glass being manufactured by the float process of manufacture. In the float process, molten glass is poured out on a bath of molten tin which is confined in an enclosed chamber containing an inert atmosphere. As the glass passes through the chamber, it is manipulated in order to form a flat glass ribbon having a desired thickness. The ribbon of glass within the float chamber is also cooled so that at an exit end of the float chamber the ribbon of glass may be lifted from the molten tin and transported out of the float glass chamber on suitable conveyor rolls.

U.S. application Ser. No. 434,642 entitled "Method of Placing a Metallic Oxide Film on a Surface of a Heated Glass Substrate" was filed on Sept. 20, 1982, now U.S. Pat. No. 4,397,671. This application is assigned to the same assignee as the present specification and is hereby incorporated by reference. This application teaches a method of developing a metal oxide film on the surface of a ribbon of float glass just after it has been lifted off the molten tin bath of a float chamber and carried out of the enclosed chamber. The method taught in the application is one in which a dry powder of several organic compounds of selected metals is sprayed onto the moving ribbon of glass while the glass is still hot after being processed in the float chamber. In this manner the powder reacts with the surface of the glass ribbon in order to generate thereon a metallic oxide film of very uniform appearance. The reader is referred to the mentioned patent for the details of the processing involved and the superior quality of the glass generated.

Once the glass has been coated in accordance with the preferred embodiment of the method of this invention, that is, the coating right after the glass is manufactured in a float glass process, the glass must be annealed, that is, cooled to room temperature. Once annealed, the glass may be cut into whatever sizes one desires.

In order to carry out the method of this specification, once the glass sheet has the metallic oxide film thereon, the next step of the method can be carried out. The second step is a step of contacting the surface of the sheet of glass having the metallic oxide film thereon with an etchant acid bath. In accordance with the teachings of the preferred embodiment of the method of this invention, the etchant acid bath contains both hydrofluoric acid and nitric acid. In accordance with the teachings of the preferred embodiment of the method of this invention, the acid bath contained by volume percent the following composition: 0.28% hydrofluoric acid; 0.28% nitric acid; and 99.44% water. The film composition developed on the surface of the glass ribbon by the preferred process had a film metallic composition of 70.1% cobalt, 10.7% chrome, and 19.2% iron.

In accordance with the preferred embodiment, the sheet of glass having the metallic oxide film thereon was left in contact with the etchant acid bath for a period of 10 days at room temperature.

When the glass sample was taken from the etchant at the end of 10 days, a decorative surface had been formed thereon. In general, the decorative surface included a plurality of elongated lines generally intersecting with one another. The decorative surface is seen in FIG. 1 which is a photograph of the sample treated with the process steps outlined above. For some reason or other the application of the metallic oxide film resulted in an etching of the glass substrate by the etchant acid bath in a manner which generated the pattern which included a plurality of elongated lines generally intersecting with one another. The pattern also included short lines running in various directions.

Figure 2:
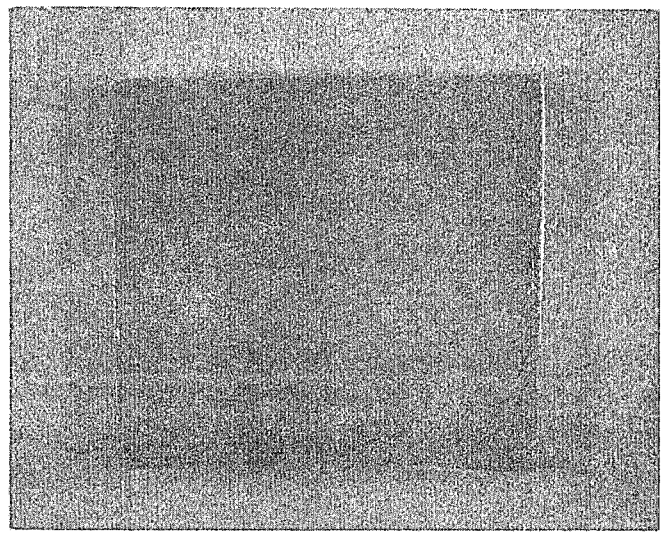
FIG. 2 is a flat glass sheet which does not have a decorative surface formed thereon.

FIG. 2 shows a sample of soda/lime silica glass which did not have a metallic oxide film placed thereon but which was contacted for the 10 day period with the etchant acid bath described above. This glass sample was uniformly etched by the etchant acid bath and no pattern such as shown in FIG. 1 was developed thereon.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method of forming a decorative surface on one side of a sheet of soda/lime silica glass which comprises the steps of:
   forming a multicomponent metallic oxide film on the one side of the sheet of soda/lime silica glass;
   contacting the surface of the sheet of glass having said metallic oxide film thereon with an etchant acid bath containing at least hydrofluoric and nitric acids; and
   interrupting contact between the surface of the glass sheet having said metallic oxide film thereon and said etchant acid bath when said etchant acid bath has reacted with said metallic oxide film to create a decorative surface on the sheet of glass, said decorative surface including a plurality of elongated lines generally intersecting with one another.

2. The method of claim 1, in which the multicomponent metallic oxide film includes cobalt, chrome, and iron as the metallic ingredients thereof.

* * * * *